(12) United States Patent
Stenkvist

(10) Patent No.: US 6,624,378 B1
(45) Date of Patent: Sep. 23, 2003

(54) RESISTANCE WELDING

(75) Inventor: Sivert Stenkvist, Torshälla (SE)

(73) Assignee: Car-O-Liner AB, Kungsor (SE)

( * ) Notice: Subject to any disclaimer, the term of this patent is extended or adjusted under 35 U.S.C. 154(b) by 0 days.

(21) Appl. No.: 09/786,882

(22) PCT Filed: Aug. 24, 1999

(86) PCT No.: PCT/SE99/01438
§ 371 (c)(1),
(2), (4) Date: Mar. 9, 2001

(87) PCT Pub. No.: WO00/15379
PCT Pub. Date: Mar. 23, 2000

(30) Foreign Application Priority Data

Sep. 11, 1998 (SE) ................................. 9803095

(51) Int. Cl.⁷ ............................................. B23K 11/11
(52) U.S. Cl. ...................... 219/86.8; 219/89; 219/86.25
(58) Field of Search .......................... 219/86.21, 86.25, 219/86.8, 89, 90

(56) References Cited

U.S. PATENT DOCUMENTS 2,235,956 A * 3/1941 Beiderman .................. 219/89
3,066,216 A * 11/1962 Busche ....................... 219/89
3,092,713 A * 6/1963 Boretti ....................... 219/89
4,861,959 A * 8/1989 Cecil .......................... 219/116
4,924,055 A * 5/1990 Nakahigasi et al. ...... 219/86.21
5,239,155 A * 8/1993 Olsson ...................... 219/86.21
5,818,007 A * 10/1998 Itatsu ........................ 219/86.25

* cited by examiner

Primary Examiner—M. Alexandra Elve
Assistant Examiner—Len Tran
(74) Attorney, Agent, or Firm—Sughrue Mion, PLLC

(57) ABSTRACT

A method and apparatus for resistance welding of objects (39) by a spot welding gun which has a C-shaped arm (9), a front electrode (11), a back electrode (13) and a pneumatic cylinder (21). The back electrode is axially moveable a limited distance by the cylinder. The gun is arranged to clamp the objects between the electrode tips (15, 17) by the cylinder (21) and to provide a welding current to flow between the tips. The back electrode is arranged to be released from, moved axially in relation to, and fastened to the cylinder to enable or simplify positioning the gun so that the electrodes are on each side of the objects, removal of the gun from the welded objects and adjustment of the electrode distance (a) based on the thickness (t) of the objects.

6 Claims, 2 Drawing Sheets

RESISTANCE WELDING

TECHNICAL FIELD

The present invention relates to a method and a device for resistance welding by a spot welding gun, for instance for plate works, such as repairs of car bodies or the like.

RELATED ART

Resistance welding or spot welding is a method by which two or more welding objects are joined together at one or more points.

Resistance welding of this kind may be used for manufacture but more generally it is used for repairs, particularly of car bodies. Resistance welding is in this respect often the most suitable joining method, where it is applicable as regards accessibility. It is a fast and effective method, which provides for stronger welding joints with fewer welding spots than if a MIG-weld or the like is used. Resistance welding using a spot welding gun is furthermore harmless to the environment; for instance the flue gases are severely reduced. Furthermore, the method provides for a low heat release in the plate around the welding spot, which provides for a retained corrosion resistance of zincified plate, and the thermal stresses in the structures are minimized.

The parameters that may be varied during the welding include electrode pressure, welding current strength and time, cooling effect, cooling time and hold time.

There are two different kinds of spot welding guns, X-guns and C-guns. The X-gun has a pneumatic cylinder, which via a lever affects the electrode. The electrode pressure is thus dependent on the lever length, which in turn affects the rest of the welding parameters.

The spot gun, to which the present invention relates, is of the C-gun type, in which the pneumatic cylinder affects the electrode directly. The electrode pressure is constant, independent of the form of the arm.

One of the problems of a conventional C-gun is that, when positioning the welding gun at the welding objects, it is difficult to pass edges or other obstacles of the welding objects due to the relatively short stroke of the cylinder.

Typically, this is solved in such a way that it will be possible for the arm to be opened or demounted. Thus, it is known to pivot a spot welding gun, called Prospot PR-10, laterally, while the arm and the front electrode are kept fixed, and thus create a larger space between the electrodes, whereby possible obstacles of the welding objects may be passed in order to then pivot the gun back to the original position. See for instance the information that was publicly available on Sep. 9, 1998 on the Internet (wwe.prospot.com/uarms.htm).

It is also known to have the engagement of the arm in the gun radially displaced from the electrodes and turn/rotate the arm with the front electrode, whereby the space between the electrodes is created. See for instance the C-gun with article number 8652 of LORS-TECNA. The arm is also demountable. In order to turn or demount the arm four screws must, however, be released. Furthermore, in all the instances described above, the electrodes must be centered afterwards.

Another problem is that the electrode distance sometimes has to be changed as a consequence of the fact that the appearance, i.e. the thickness, of the welding objects has changed. This is, according to the known arm, solved by the front electrode being exchangeable and/or movable.

Thus, particularly if both obstacles have to be passed and the electrode distance has to be adjusted, extensive working operations are needed, which will severely reduce the capacity of the spot welding gun.

SUMMARY OF THE INVENTION

It is an object of the present invention to provide a spot welding gun lacking one or more of the problems which may appear using a spot welding gun according to the known art.

Thus, it is an object to provide a spot welding gun, which through an uncomplicated process enables or simplifies the passage of obstacles during positioning of the spot gun at the welding objects and during removal of the gun therefrom, while maintaining the electrode centering.

A further object of the invention is to provide a spot welding gun, which moreover allows adjustment of the electrode distance, while the number of working operations is reduced to a minimum.

Yet a further object of the invention is to provide a spot welding gun of the kind mentioned above, which is compact and reliable.

These and other objects are realized according to one aspect of the invention by a spot welding gun for resistance welding of objects comprising a C-shaped arm, a front and a back electrode and a cylinder, which is driven pneumatically or the like, the back electrode being axially movable a limited distance by the cylinder. The spot welding gun is arranged to clamp the objects between the electrode tips by impelling the cylinder forwards and to flow a welding current between said electrode tips. According to the invention the back electrode is arranged to be releasable from, axially movable in relation to, and lockable to the cylinder.

The inventive method comprises, before the welding, releasing the back electrode from the cylinder, moving the back electrode axially backwards enough to enable or simplify the positioning of the spot welding gun, positioning the spot welding gun so that the electrodes are on each side of the objects, moving the back electrode axially forwards to a position where its electrode tip is at a distance from the front electrode less than the sum of the stroke of the cylinder, and the thickness of the objects, and fastening the back electrode to said cylinder.

The method enables or simplifies the passage of obstacles during positioning of the spot welding gun and the method for adjustment of the electrode distance in one and the same operation, which will very considerably simplify the handling of the spot welding gun. Furthermore, the electrode centering will be maintained during the entire working operation.

The method after welding comprises releasing the back electrode from the cylinder, and moving the back electrode axially backwards enough to enable or simplify the removal of the spot welding gun from the welded objects.

The back electrode is preferably able to be moved axially backwards at least to a position where its electrode tip is inside the cylinder, and forwards at least to a position where its electrode tip is at a distance from the front electrode less than the sum of the stroke of the cylinder and the thickness of the thinnest object for which the gun is intended to be used.

Preferably, the back electrode is arranged to be released manually and quickly from and fastened to the cylinder, via a locking lever, which will further simplify the working operation of the gun.

The C-formed arm with the front electrode may be radially turnable/rotatable around the cylinder, and/or demountable.

An advantage of the spot welding gun according to the present invention is its manageability, which provides for a high working capacity.

A further advantage of the invention is that the centering of the electrodes is maintained. No advanced centering mechanisms or fastening mechanisms are thus needed.

More advantages of the invention will be apparent in the description below.

BRIEF DESCRIPTION OF THE DRAWINGS

The invention will be described closer below with reference to FIGS. 1 and 2, which are only shown in order to illustrate the invention and shall therefore in no way limit the same.

PREFERRED EMBODIMENTS

In the following description, for the purpose of explaining and not limiting the invention, specific details are given, such as particular applications, techniques, etc., in order to give a thorough understanding of the invention. It shall, however, be apparent for a man skilled in the art that the invention may be practised in a manifold of other forms than these.

Figure 1:
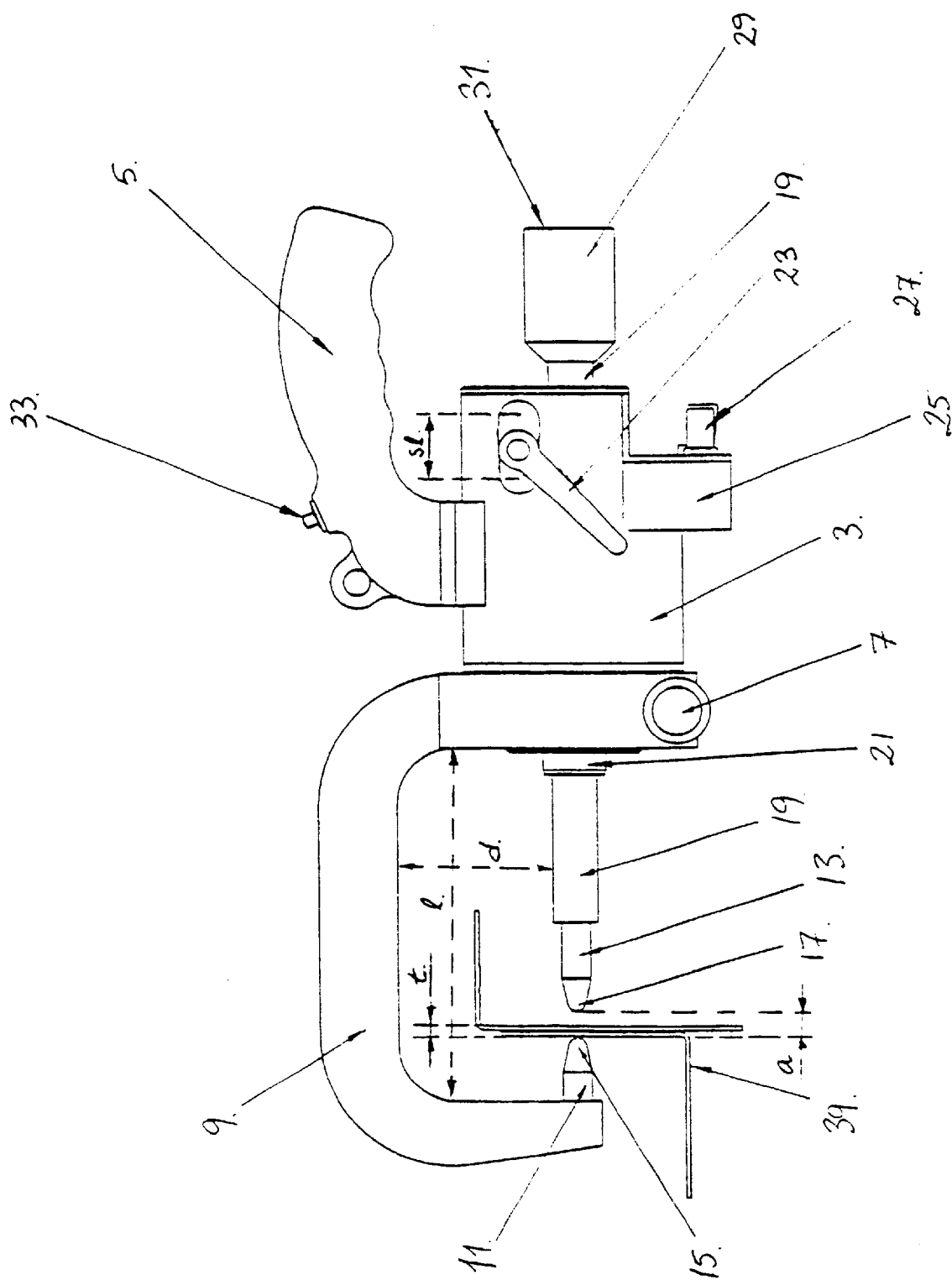
FIG. 1 shows an embodiment of the present invention as seen from one side.

In FIG. 1 there is shown a side view of an inventive embodiment of a device, or a so-called C-gun, 1 for resistance or spot welding. The C-gun comprises a substantially cylindrical housing 3 with handles 5, 7 and a C-shaped arm 9, at the ends of which two electrodes 11, 13, particularly of copper, are facing each other.

The front electrode 11 is preferably firmly mounted and has a rounded and possibly somewhat flattened electrode tip 15. The back electrode has a preferably rounded and possibly somewhat flattened electrode tip 17 and also a thicker diameter 19 except at the part closest to the front electrode 11.

According to the present invention the back electrode is axially movable in a stepless manner, whereby it may be released from or fastened to a pneumatic cylinder 21 by means of a locking lever 23. The pneumatic cylinder 21 is in turn by compressed air axially impellable a limited distance, the so-called stroke s1 of the cylinder, for instance 20 mm.

Furthermore, the C-gun comprises a housing 25 for connection of compressed air to the pneumatic cylinder 21, for electrical connection of the front electrode 11 and for connection of controlling electronics. The back end of the C-gun comprises an electrically insulating socket 29, which surrounds the back end of the back electrode, where also electrical connection 31 to said electrode exists. The handle 5 finally comprises a simple switch 33.

The connection and regulation of pneumatics and welding current may be realized in different known ways and will not be closer described here.

Figure 2:
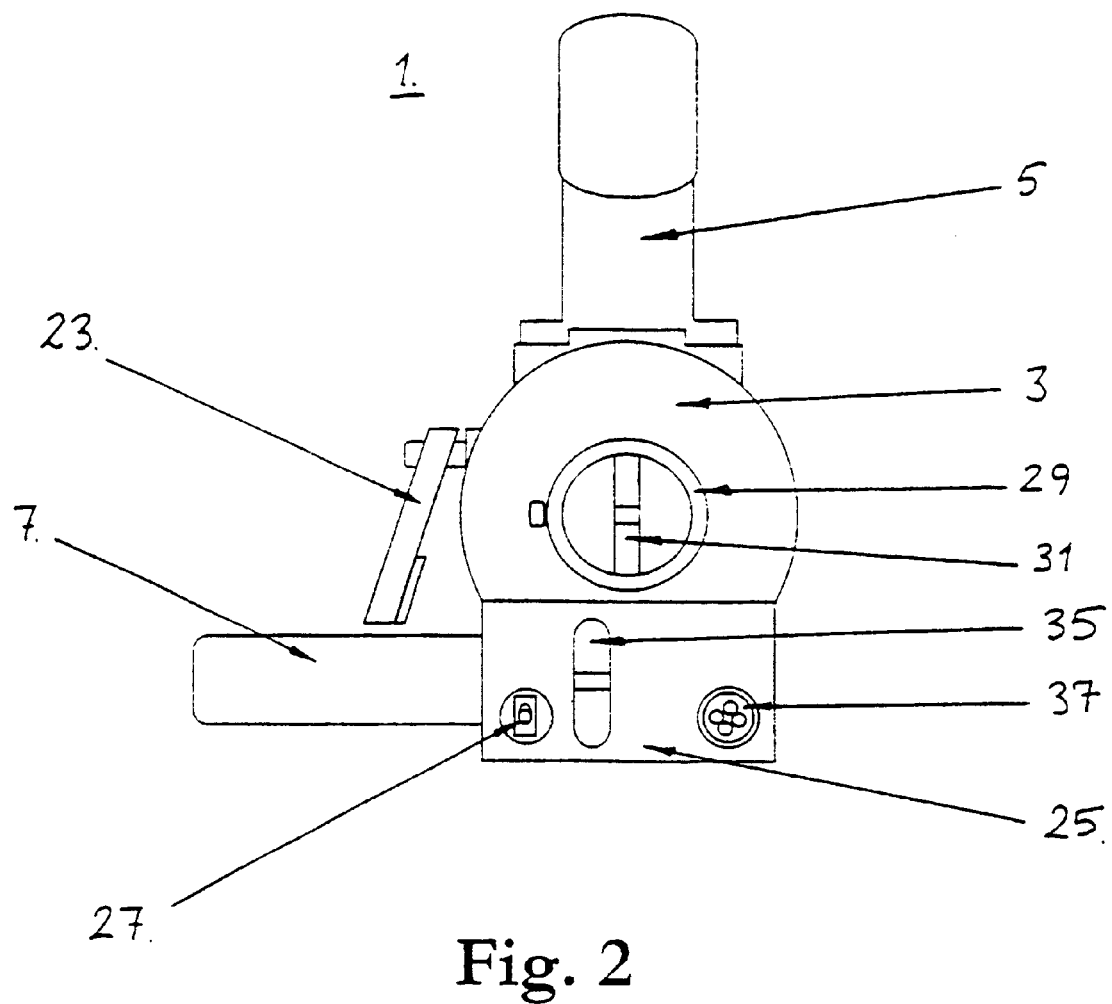
FIG. 2 shows the same embodiment as seen from behind.

In FIG. 2, which shows the same embodiment from behind, all connections may be seen. As mentioned, the housing 25 comprises a connection 27 for compressed air, an electrical connection 35 to the front electrode and a connection 37 for controlling electronics. The electrical connection 31 directly to the back electrode is also shown. The connection 35 is in electrical contact with the front electrode via electrical connectors inside the housings 25 and 3 and in the arm 9.

According to the invention the back electrode 13 may consequently be released from the pneumatic cylinder 21 and moved axially to a desired position or completely removed without subsequent centerings or other adjustments being necessary.

This construction allows passage of obstacles, such as saddle beam sills, at objects 39 during positioning and removal of the spot welding gun 1 and adjustment of the electrode distance a in the same operation.

This together with an otherwise ergonomically designed construction provides a spot welding gun, which is very easy and handy to work with.

Thus, the working operation for positioning the gun 1 and adjustment of the electrode distance a particularly comprises the following steps:

1. Releasing the back electrode 13 from the cylinder 21.
2. Movement of the back electrode 13 axially backwards sufficiently long to enable or simplify the positioning of the spot welding gun. In the present embodiment there is no limitation as regards how far the electrode may be moved in this direction, since it may even be demounted.
3. Positioning the spot welding gun so that the electrodes 11, 13 exist on each side of the objects 39. The electrodes shall be positioned at the point where it is desired to have the weld joint.
4. Movement of the back electrode 13 axially forwards to a position where its electrode tip 17 is at a distance a from the front electrode 11, which is shorter than the sum of the stroke s1 of the cylinder and the thickness t of the objects. The adjustment is not critical—the principal thing is that the electrode is moved as far forwards that the stroke of the cylinder is "sufficient" to attain the necessary electrode pressure.
5. Fastening the back electrode 13 to the cylinder 21.

In an analogous way the working operation for removal of the gun comprises particularly the following steps:

1. Releasing the back electrode 13 from the cylinder 21.
2. Movement of the back electrode 13 axially backwards sufficiently long to enable or simplify the removal of the welding gun from the welded objects 39.

Another feature of the welding gun is that the C-shaped arm 9 is radially turnable/rotatable around the cylindrical housing 3. Preferably, the C-shaped arm has in its back portion a substantially ring-formed part, which is threaded onto the front portion of the housing, which here is of a smaller diameter. The ring-formed part of the arm has a slit or a groove, particularly down in the lower part, so that it may be fastened to the housing 3 by a simple screw. Possibly, if it should be needed, a fastening plate may be screwed from the front side.

In the present embodiment the screw is integrated with the handle 7, whereby the arm 9 is turned by releasing the arm (the screw is released by turning the handle 7), turning the arm 9 and fastening the arm (the screw is fastened by turning the handle 7). Of course, the C-shaped arm is then also demountable and exchangeable to another arm of a suitable size. The standard arm shown in FIG. 1 has a depth d of 80 mm and a length l of 160 mm, but the only limitation in this respect is the extent of ungainliness of the welding gun when using very large arms.

If the C-shaped part of the arm will substantially be in another direction than vertical, the slit or groove of the ring-formed part and the handle 7 with the screw may be located at another radial position, so that the welding gun achieves a suitable ergonomic design. Possibly, the handle 7 may be mounted directly at the housing 3 and thus be fixed, while the fastening screw may be provided with a fastening lever similar to the one 23, which locks the back electrode 13.

An inventive welding gun described above shall particularly be designed to satisfy different quality demands of car manufacturers, particularly for the so-called aftermarket. The welding gun must have a sufficient clamping force, current strength and cooling capacity so that it manages plate thicknesses and rust-proofing coatings existing at the car bodies. Welding time, cooling time and holding time shall have an exact and reliable regulation. If the different welding parameters are optimized, after-treatment is normally unnecessary, but it is sufficient with just a slight grinding with grinding paper before painting.

The present invention as herein described solves the problems, which are associated with known art. It is, of course, not limited to the embodiments described above and shown in the drawings, but may be modified within the scope of the appended claims.

What is claimed is:

1. Spot welding gun for resistance welding of objects (39), comprising: a C-shaped arm (9), a first electrode (11), a back electrode (13) and a fluid driven cylinder (21), the back electrode being axially moveable a limited distance by the cylinder, the spot welding gun being arranged to clamp the objects between tips (15, 17) of the electrodes by actuating the cylinder and to provide a welding current flow between said electrode tips, wherein the back electrode is arranged to be releasable from, axially movable in relation to, and fastenable to the cylinder in another axial position to enable or simplify positioning the spot welding gun so that the electrodes are at opposite sides of the objects, removal of the spot welding gun from the welded objects and adjustment of an electrode spacing distance (a) in relation to the thickness (t) of the objects.

2. Spot welding gun according to claim 1, wherein the back electrode is movable axially backwards at least to a position where its electrode tip is inside the cylinder.

3. Spot welding gun according to claim 1 or 2, wherein the back electrode is to adjust the electrode spacing distance (a), movable axially forwards to a position where its electrode tip is at a distance from the front electrode which is shorter than the sum of a stroke (s1) of the cylinder and the thickness of the objects.

4. Spot welding gun for resistance welding of objects (39), comprising: a C-shaped arm (9), a first electrode (11), a back electrode (13) and a fluid driven cylinder (21), the back electrode being axially moveable a limited distance by the cylinder, the spot welding gun being arranged to clamp the objects between tips (15, 17) of the electrodes by actuating the cylinder and to provide a welding current flow between said electrode tips, wherein the back electrode is arranged to be releasable from, axially movable in relation to, and fastenable to the cylinder to enable or simplify positioning the spot welding gun so that the electrodes are at opposite sides of the objects, removal of the spot welding gun from the welded objects and adjustment of an electrode spacing distance (a) in relation to the thickness (t) of the objects, wherein the back electrode is manually and quickly releasable from and fastenable to the cylinder via a fastening lever (23).

5. Spot welding gun according to claim 1 or 2, wherein the C-shaped arm is radially turnable/rotatable around the cylinder.

6. Spot welding gun according to claim 1 or 2, wherein the electrodes are copper.

* * * * *